May 11, 1965 P. L. RICHMAN 3,183,446
ELECTRICAL SIGNAL COMPARATOR
Filed March 15, 1962 2 Sheets-Sheet 1

INVENTOR.
PETER L. RICHMAN
BY
ATTORNEYS

United States Patent Office 3,183,446
Patented May 11, 1965

3,183,446
ELECTRICAL SIGNAL COMPARATOR
Peter L. Richman, Lexington, Mass., assignor, by mesne assignments, to Weston Instruments, Inc., Newark, N.J., a corporation of Texas
Filed Mar. 15, 1962, Ser. No. 179,849
11 Claims. (Cl. 328—151)

This invention relates to signal comparators and more particularly to devices by which the amplitude of a test signal is compared with the amplitude of a reference signal for effectuating operation of an output indicator circuit, whereby the accuracy and stability of the test signal can be evaluated.

In order to calibrate, adjust or check the performance of a circuit or instrument, exemplary voltage signals provided by the circuit may be examined by comparison of the voltage signal with a high precision, substantially constant reference potential of nearly equal value. For visual analysis, the comparison results are generally displayed graphically on an indicator means, such as a cathode ray oscilloscope. A number of circuits have been proposed for accepting a pair of signals to produce an output proportional to the voltage difference between the signals. Many of these devices have used low frequency periodic switches or choppers in their operation. If it is desired to know the sense as well as the value of the voltage difference, such devices have usually employed multiple, synchronized choppers, as a consequence of which, the circuits have been expensive, complex and difficult to adjust.

Where, in addition, high precision in measurement or comparison is desired, the accuracy of the comparators will be preferably within a few thousandths of a percent of the test signal amplitude. In such cases, if the entire test signal constitutes the input to an oscilloscope, the ratio of full-scale reading to the deviation of the test signal with respect to the reference signal does not allow the minute difference between signals to become apparent. Although the oscilloscope scale can be changed to increase the resolution, the scale change will cause the instrument to be badly overloaded. Not only are oscilloscopes subject to overload capability limitations, but they are subject to drift. This latter can be a source of substantial error when dealing with precisions of the order desired, particularly in cases where the oscilloscope is employed as the measuring instrument itself.

The present invention therefore has as a principal object, the provision of a high-precision comparator device for calibrating a test voltage. Other objects of the present invention are to provide a device of the type described which is characterized by its high precision, stability, simplicity and positive operation in providing an output to an oscilloscope where the relationship between a test signal and a reference level can be readily and accurately determined within the capabilities of the oscilloscope.

Other objects of the present invention will in part appear obvious and will in part appear hereinafter. The invention accordingly comprises the apparatus possessing the construction, combination of elements, and arrangement of parts which are exemplified in the following detailed disclosure, and the scope of the application of which will be indicated in the claims.

The objects of the present invention are accomplished by providing a precision comparison device for comparing an oscillatory voltage with a direct current reference voltage which comprises means for providing to a summing junction a first wavetrain limited within a predetermined value at least on one side of a fixed reference plane potential common to both voltages, sampling means for alternately sampling the first wavetrain and the fixed reference plane potential so as to provide a second wavetrain having alternating portions thereof derived respectively from the first wavetrain and the fixed reference plane potential, whereby any difference between the peak value of a portion derived from the first wavetrain and the value of an adjacent portion derived from the fixed reference plane potential is proportional to the corresponding difference between the peak value of the oscillatory voltage and the value of the reference voltage.

For a fuller understanding of the nature and objects of the invention, reference should be had to the following detailed description taken in connnection with the accompanying drawings in which.

Figure 1:
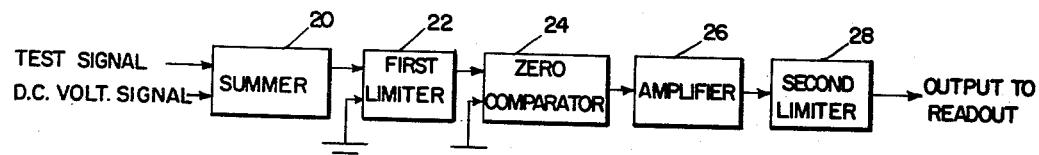
FIG. 1 is a block diagram showing the relations of the elements of one embodiment to the invention.

Generally, as will be seen in FIG. 1, according to the present invention the above objects are achieved by providing summing means 20 adapted to accept a pair of inputs consisting of a direct-current reference voltage and a datum voltage, for summing the two. The datum voltage is shown, for example, as an oscillatory signal. Summing means 20 is connected to a first limiting means 22 for extracting that part of the summed waveform which contains information relating to the difference between the two input voltages. In the invention this is done by clipping the summed waveform between predetermined levels on either or both sides of a fixed reference plane potential, or ground potential, and for this reason, the limiting means is shown as having a grounded input. Limiting means 22 is connected with one of its two inputs to a sampling means such as a zero comparator or chopper 24. The other input of chopper 24 is maintained at ground potential. The zero comparator is a low frequency periodic switch having an output which is connectable in sequence between the two inputs. Thus the output of chopper 24 is a periodic potential or second waveform constituted of the clipped portion of the summer waveform and the ground potential in time-alternate sections. In the preferred embodiment, amplifying means 26 are included for accurately amplifying the second waveform in order to provide better resolution between the peak amplitudes of the alternate portions of the second waveform. The resolution is still further increased by second limiting means 28 for clipping the amplifier's output before presentation to a read-out instrument.

Figure 2:
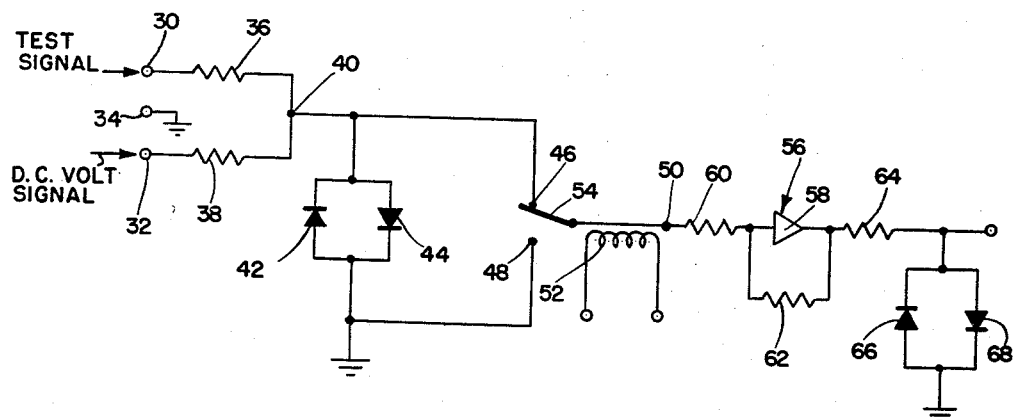
FIG. 2 is a schematic circuit diagram of one embodiment of the invention in detail.

Referring now to FIG. 2 there will be seen a schematic circuit diagram embodying the principles of the invention heretofore disclosed. The circuit includes a pair of input terminals 30 and 32 and a terminal 34 connected to a fixed reference plane potential such as ground. The oscillatory datum signal intended to be examined is impressed between ground treminal 34 and one of terminals 30 and 32. A precision D.C. reference source is applied between ground and the other of terminals 30 and 32. The D.C. reference potential may be supplied from a variety of sources such as a stabilized D.C. reference circuit, or the like. It will be apparent that because the invention is primarily intended to provide a precision comparison, as for calibration purpose, the peak value of the input datum voltage will be approximately known; thus the reference voltage can be so selected as to be nearly equal to the datum voltage peak level. Terminals 30 and 32 therefor constitute the input terminals to the summing means of the invention. This means, in the form shown in FIG. 2, comprises a resistive network including a pair of resistors 36 and 38. One side of resistor 36 is connected to terminal 30, and one side of resistor 38 is connected to terminal 32. The other sides of the resistors are connected to one another, as at summing junction 40. Tho two input signals can be said to be parallel to one another inasmuch as they both have a common ground.

It is possible to connect to inputs the summing means in other ways. For instance, the datum voltage source may have one side grounded and the other side connected to one polarity of the D.C. reference, the other pole of the reference being coupled via a series resistor to the input of the first limiter. In such an arrangement, the D.C. reference voltage is floating with respect to ground. Thus, it becomes difficult to accurately check or calibrate the D.C. source.

Alternatively, one side of the D.C. source may be grounded while the other side is connected to one side of the datum voltage source, the other side of the voltage datum source being applied to the input terminal of the first limiting means through a series resistance. This arrangement floats the datum voltage source with respect to ground. Where the datum voltage source, for instance, is derived from a transformer, the floating of the datum voltage may tend to introduce stray capacitive effects.

With the preferred arrangement of inputs in parallel as shown in FIG. 2, neither voltage source is floating. Hence, stray capacitive effects are minimized and the D.C. reference source can readily be checked without adverse effect during operation of the apparatus.

In the embodiment shown in FIG. 2, the summing means comprises a resistive network in which resistors 36 and 38 preferably are equal to one another within a ratio error of less than 0.003%. The accuracy with which the comparison of the two input voltages is to be made is limited to a first order by the precision with which these two resistors can be matched and limited only to a second order by the other electronic components of the circuit. In practice, it has been found that a resistive pair can be obtained with a ratio error of 300 microvolts out of 10 volts (referred to the input) over a full 0° to 52° C. rated temperature range and through a period well exceeding one year.

Summing junction 40 is coupled to one input of first limiting means 22 which in the form shown comprises a pair of diodes 42 and 44 in parallel. The diodes are disposed back-to-back i.e., the anode of one diode and the cathode of the other are connected to each other and to junction 40. The cathode of the one diode and the anode of the other are similarly connected to each other and to ground. The provision of a passive limiting means of this type ensures minimization of transients and therefore contributes to the precision operation of the invention. For example, these diodes are high-speed (4 millimicrosecond recovery) low-capacitance, silicon diodes. The inherent semiconductor breakdown potential provides the outside limits within which the limiting means is operative. The provision of a diode pair in the limiting means allows the latter to clip the wave peaks regardless of the polarities of the signals fed to the summing means. However, with the proper choice of the signal's polarities, the limiting means need include but one diode appropriately poled.

The zero comparator of the invention is shown in FIG. 2 as a conventional chopper having a pair of input terminals 46 and 48 and an output terminal 50. One of the input terminals, for instance terminal 48, is connected to ground; the other input terminal, in this instance terminal 46, is connected to the ungrounded side of diodes 42 and 44, as at junction 40. The chopper is preferably any low-frequency, low noise, periodic switch in which the alternate connections between input terminals 46 and 48 to output terminal 50 is of the "make-before-break" type to avoid the introduction of transients. The zero comparator includes the usual coil 52 for driving chopper armature 54 at a predetermined switching rate. The frequency of the driving potential impressed on coil 52 is at least equal to or preferably less than the frequency of the datum signal impressed across terminal 34 and one of terminals 30 and 32. It should be noted that the zero comparator, although shown as an electromechanical chopper, can be any device which is the equivalent thereof, such as known all-electronic choppers, electro-optical choppers, or the like.

Output terminal 50 of the zero comparator is in turn connected to the input of amplifier means which, in FIG. 2, comprises chopper-stabilized operational amplifier 56. Typically, operational amplifiers are direct coupled, high-gain, chopper-stabilized negative feedback stabilized amplifiers with wide band-pass characteristics. In the example shown, operational amplifier 56 comprises a very high amplifier stage 58, i.e., one having for instance an alpha of many thousand, an input impedance or series resistor 60 and a feedback resistor 62. The latter is connected to a summing junction between the output of amplifier stage 58 and a point intermediate resistor 60 and the input to the amplifier stage. The overall gain of such an operational amplifier is then determined by the ratio of the values of resistor 62 to resistor 60. It will be apparent to those skilled in the art that the reason for using an operational amplifier is to provide the relatively distortion-free, stable amplification desired in precision instruments, and particularly to obtain wide-band amplification while maintaining D.C. integrity. Other amplifier devices, capable of meeting these criteria, may also be employed. The output of the amplifier is connected to one side of load resistor 64. The other side of the load resistor is in turn connected to the input of second limiting means 28. The latter means is similar to the first limiting means and thus may comprise a pair of diodes 66 and 68 in parallel, the anode of one diode and the cathode of the other being connected to the other side of load resistor 64, while the cathode of the one diode and the anode of the other are in turn connected to ground. If the polarities of the input signals to the invention can be selected, then limiting means 28, like limiting means 22, can be formed of but a single diode appropriately poled.

The operation of the invention can be described in connection with exemplary values. For instance, assuming that a sinusoidal A.C. waveform (shown as 70 in FIG. 3A) of approximately 10 volts peak value is applied across terminals 30 and 34 and a D.C. voltage level (shown as 72 in FIG. 3A) of precisely 10 volts is similarly applied across terminals 32 and 34, the resistive network of parallel resistors 36 and 38 will sum these voltages. The summed waveform 74 appears at junction 40 reduced in overall amplitude by a factor of two due to the inherent attentuation characteristics of the resistive network.

Figure 4:
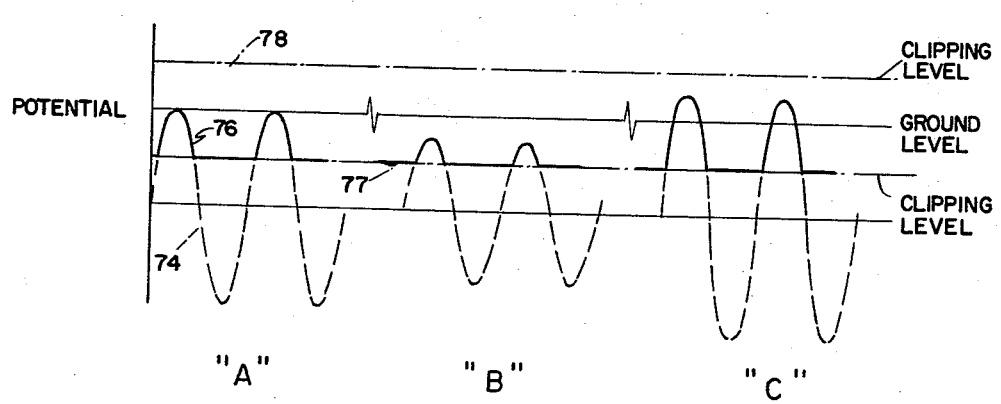
FIG. 4 is a graphical representation of exemplary waveforms showing clipping of the summed output waveforms (in broken lines) of FIG. 3 and the resulting clipped waveforms (in solid lines)

Summed waveform 74 is applied to limiting means 22. Because with a two diode limiter the anode of diode 42 and the cathode of diode 44 are both grounded, waveform 74 as shown in FIG. 4A (wherein the extent of deviation of waveform 74 from ground is exaggerated for the sake of clarity) will be limited or clipped within an amplitude range defined by two clipping levels 77 and 78 extending respectively on opposite sides of the ground level. Where the limiter includes but a single diode, the clipping need be only on that side of ground at which the bulk of the summed waveform appears. The value of the levels is established by the breakdown voltage of the diodes. For instance, with diodes as hereinbefore described the levels lie within limits of 0.7 volt on either side of ground, this value being a typical breakdown voltage. Hence, the maximum voltage passed by limiting means 22 in such case is about 1.4 volts, the vast bulk of which will lie within a 0.7 volt range on one side of ground. The only portion of waveform 74 passed by the limiting means is then that portion indicated at 76 bearing the information relating to the difference between the value of reference voltage 72 and the peak values of waveform 70. This latter portion may be termed the error signal. The limiting means not only serves to eliminate the portion of waveform 74 extraneous to the comparison, but that portion which would also introduce difficulties in subsequent amplification of the error signal in view of the overloading effect that large amplitude components would have on the following amplifier. Any limiting means of similar performance can be employed in like manner, although passive limiters are preferred.

The error signal is then applied to input terminal 46 of the chopper of zero comparator 24. Assuming the A.C. datum signal or wave form 70 to be, for instance, an audio or higher frequency signal, the line potential driving chopper coil 52 can be the usual 60 cycle voltage. Coil 52 can be driven at a multiple of the frequency of the fundamental of waveform 70 to lock the chopper comparison rate with the input sinusoid frequency so that the two will not drift with respect to one another. On the oher hand, the chopper drive frequency can be asynchronous with respect to the A.C. signal frequency; this will result in a time shift of the output wave-train which will not, however, mar the readability of the wave-train but actually improve the readability.

Figure 3:
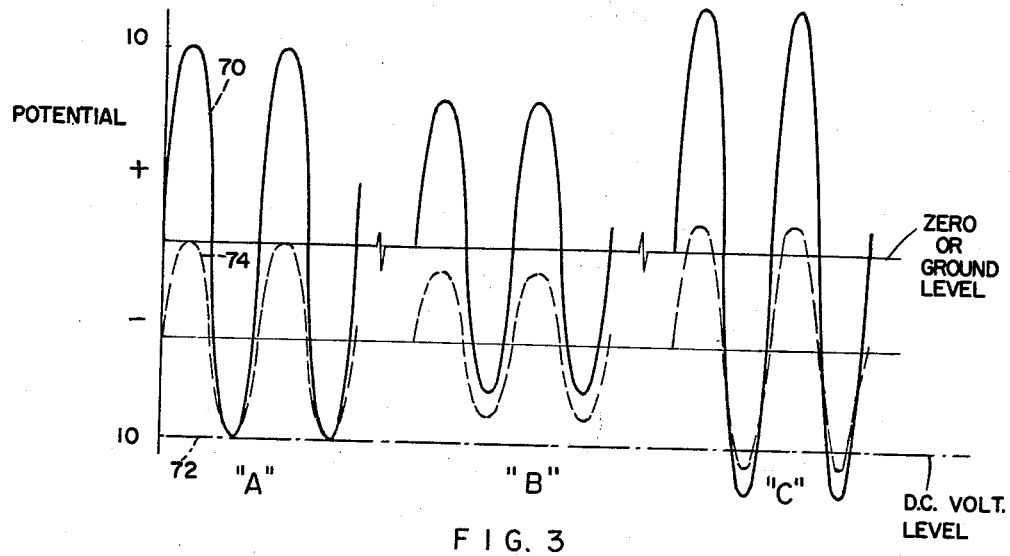
FIG. 3 is a graphical representation showing three exemplary waveforms of the inputs and outputs of the summing portion of the embodiment of FIG. 2.
Figure 5:
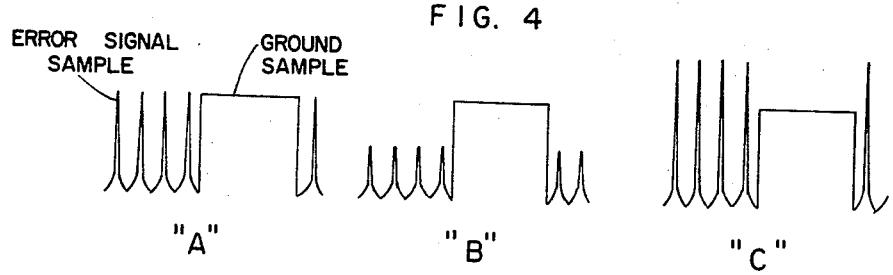
FIG. 5 is a graphical representation of three exemplary waveforms at the output of the "zero comparator" or chopper of both of the embodiments of FIG. 2.

The other terminal 48 of the chopper is grounded; hence, as chopper armature 54 vibrates between alternate contacts with terminals 46 and 48, the output of the chopper will consist of alternate samplings of the error signal and ground, both referred to the bias on the grounded side of the limiting means. A typical waveform of the chopper output is shown in FIG. 5A the time axis being considerably shortened in comparison to the time axis in FIGS. 3 and 4. Reference has heretofore been made only to the portion of FIGS. 3, 4 and 5 marked "A" in which a typical A.C. datum signal is selected to have a peak value exactly equal to the D.C. reference level. As will be seen in FIG. 5A, the error signal portion of the wave-train forming the output of the chopper, exhibits peak values exactly level with the peak value of the ground potential sample. Referring to portions "B" of FIGS. 3 through 5 inclusive, it will be seen that other exemplary A.C. datum signal peaks are selected to be somewhat smaller than the D.C. reference level, and this difference appears quite clearly in the difference between the peak values of the error signal sample forming the waveform of FIG. 5B. Similarly the selected exemplary A.C. datum signal of FIG. 3C is somewhat larger in peak value than the reference level, and this difference is clearly reflected in the disparity of the appropriate portions of the waveform of FIG. 5.

The resolution of the device is enhanced by applying the chopper output wave form to the input of amplifier 56. The latter need only have a bandwidth large enough to insure passage of relatively sharply clipped wave peaks without significant amplitude error. The amplifier may have a variable gain or may exhibit a fixed overall gain, for instance, of about 30. The input resistor 60 to the amplifier is preferably of the same value as resistors 36 and 38; thus the overall attenuation of the signals introduced into amplifier stage 58 is a factor of 3. Assuming then a 3-to-1 attenuation, an overall amplifier gain of 30, and the exemplary values heretofore given of input voltages and of clipping levels, the output of amplifier 56 is therefore 10 times the limited sum of the signals applied to terminals 30 and 32, about 7 volts maximum at null.

To avoid overloading the read-out device, as well as to further increase resolution, the amplifier output is, in turn, applied to second limiting means 28 in which diodes 66 and 68 clip the amplifier output, for example, within 0.25 volt levels set by the forward conducting potential of the diodes which, in such case, are germanium again, limiting means 28 as previously explained in connection with limiting means 22 can be formed of but a single appropriately poled diode. The output of limiting means 28 is now available for application to oscilloscope's input.

For a typical oscilloscope with a 20 millivolts-per-centimeter sensitivity, and capable of accepting 250 millivolts without overload, the sensitivity referred to the input of the comparison device would then be 2 millivolts-per-centimeter. Thus, 400 microvolts will be readily discernible a deflection on the face of the oscilloscope of 0.2 centimeter.

Hence, an error of 400 microvolts between two input levels of the device up to 20 volts is easily seen thus implying a resolution of 0.002%. It will be seen that the inclusion of an automatic zero reference provided by the chopper to the input of the amplifier insures that any small offset in the latter will be eliminated as an error factor. Additionally, it will be noted that in view of the fact that the ultimate determination of error is based upon the equality or inequality of the peak amplitude of the clipped A.C. with reference to the automatic ground or zero reference line, the oscilloscope is not being used as a precise read-out but rather as a null device. Thus, oscilloscope drift and variations in oscilloscope gain have been eliminated as error factors. The wave forms shown in FIG. 5 have heretofore been described as illustrative of the output of the chopper or zero comparator 24. These wave forms are also typical of the wave form of the output of the second limiting means made available for oscilloscope display, it being understood that the coaction of the amplifier and second limiter reduces the total amplitude of the waveforms while enhancing the disparity of any difference between the peak values of the corresponding waveform sections, as well as sharpening the spikes which are proportional to the peaks of the input A.C. waveform.

Since certain changes may be made in the above apparatus without departing from the scope of the invention herein involved, it is intended that all matter contained in the above description or shown in the accompanying drawing shall be interpreted in an illustrative and not in a limiting sense.

What is claimed is:

1. A precision comparison device for comparing an oscillatory voltage with a direct-current reference voltage, said device comprising in combination:
   means for providing to a summing junction a first wavetrain, said first wavetrain having an amplitude which is an attenuated sum of said voltages and being limited within a predetermined value at least on one side of a fixed reference plane potential common to both of said voltages,
   sampling means for alternately sampling said first wavetrain on said summing junction and said fixed reference plane potential so as to provide a second wavetrain having alternating portions thereof derived respectively from said first wavetrain and said fixed reference plane potential, and
   said sampling means being disconnected from said summing junction when sampling said plane potential, any difference between the peak value of a portion derived from said first wavetrain and the value of an adjacent portion derived from said fixed reference plane potential being proportional to a corresponding difference between the peak value of said oscillatory voltage and the value of said reference voltage.

2. A precision comparison device for comparing an oscillatory voltage with a direct-current reference voltage, said device comprising in combination:
   means for providing to a summing junction a first wavetrain, said first wavetrain having an amplitude which is an attenuated sum of said voltages,
   limiting means coupled to said summing junction for limiting said first wavetrain within predetermined limits on at least one side of a fixed reference plane potential common to both of said voltages, sampling means for alternately sampling said first wavetrain on said summing junction and said fixed reference plane potential so as to provide a second wavetrain having alternating portions thereof derived respectively from said first wavetrain and said fixed reference plane potential, said sampling means being disconnected from said summing junction when sampling said fixed reference plane potential, and amplifying means coupled to said sampling means for amplifying said second wavetrain thereby increasing the resolution between said alternating portions whereby any difference between the peak value of a portion derived from said first wavetrain and the value of an adjacent portion derived from said fixed reference plane potential is proportional to a corresponding difference between the peak value of said oscillatory voltage and the value of said reference voltage.

3. A precision comparison device as defined in claim 1 wherein said means for providing to said summing junction said first wavetrain includes a network having a substantially resistive impedance.

4. A precision comparison device as defined in claim 2 wherein said limiting means includes at least one diode coupled between said summing junction and said fixed reference plane potential.

5. A precision comparison device as defined in claim 1 wherein said sampling means comprises a chopper having an output terminal alternately connectable to said summing junction and to said reference plane potential.

6. A precision comparison device as defined in claim 2 wherein said amplifying means comprises a chopper stabilized amplifier having its input stage coupled directly to the output of said sampling means.

7. A precision comparison device as defined in claim 6 wherein said amplifying means includes an output terminal and at least one diode connected between said output terminal and said fixed reference plane potential.

8. A precision comparison device as defined in claim 1 and further including limiting means for limiting said second wavetrain thereby providing a high resolution output by clipping the peak values of the portions derived from said oscillatory voltage within predetermined limits on at least one side of said reference plane potential.

9. A precision comparison device as defined in claim 2 wherein the sampling rate of said sampling means is locked at a multiple of the fundamental frequency of said oscillatory voltage.

10. A precision comparison device as defined in claim 2 wherein said amplifying means comprises a wide-band-pass, high-gain, negative-feedback-stabilized amplifier having its input directly coupled to the output of said sampling means.

11. A precision comparison device for comparing an oscillatory voltage with a direct-current reference voltage, said device comprising in combination:

a pair of input terminals, a summing junction, a first resistor coupling one of said input terminals to said summing junction, a second resistor coupling the other of said input terminals to said summing junction, said input terminals being adapted to have said voltages respectively applied thereto for providing to said summing junction a first wavetrain having an amplitude which is an attenuated sum of said voltages, first diode peak clipping means connected between said summing junction and a fixed reference plane potential common to both of said voltages, sampling means for alternately sampling said first wavetrain on said summing junction and said fixed reference plane potential, said sampling means being disconnected from said summing junction when sampling said plane potential, means including an operational amplifier having an input circuit and an output circuit, said input circuit being directly coupled to the output of said sampling means, and second diode peak clipping means connected between said reference plane potential and said amplifier's output circuit for providing a second wavetrain having alternating portions thereof derived respectively from said first wavetrain and said fixed reference plane potential whereby any difference between the peak value of a portion derived from said first wavetrain and the value of an adjacent portion derived from said fixed reference plane potential is proportional to a corresponding difference between the peak value of said oscillatory voltage and the value of said reference voltage.

References Cited by the Examiner

UNITED STATES PATENTS

| | | | |
|---|---|---|---|
| 2,724,022 | 11/55 | Williams et al. | 330—9 |
| 2,994,825 | 8/61 | Anderson | 330—9 |
| 3,015,074 | 12/61 | Taskett | 330—9 |
| 3,026,423 | 3/62 | Tedeschi et al. | 307—88.5 |

OTHER REFERENCES

"Electronic Analog Computers," Korn & Korn, 2nd edition 1956, McGraw-Hill Book Co., Inc., page 308, FIGURE 6.33b.

IBM Technical Disclosure Bulletin, "Comparator," Wortzman, vol. 3, No. 1, June 1960, page 59.

JOHN W. HUCKERT, *Primary Examiner.*

ARTHUR GAUSS, *Examiner.*

Disclaimer and Dedication 3,183,446.—*Peter L. Richman*, Lexington, Mass. ELECTRICAL SIGNAL COMPARATOR. Patent dated May 11, 1965. Disclaimer and dedication filed Mar. 17, 1971, by the assignee, *Weston Instruments, Inc.*

Hereby enters this disclaimer to the remaining term of said patent and dedicates said patent to the Public.

[*Official Gazette April 27, 1971.*]